(12) United States Patent
Sapiro et al.

(10) Patent No.: US 10,146,991 B2
(45) Date of Patent: Dec. 4, 2018

(54) SYSTEMS AND METHODS FOR LARGE SCALE FACE IDENTIFICATION AND VERIFICATION

(71) Applicant: Duke University, Durham, NC (US)

(72) Inventors: Guillermo Sapiro, Durham, NC (US); Qiang Qiu, Durham, NC (US); Alexander Bronstein, Durham, NC (US)

(73) Assignee: Duke University, Durham, NC (US)

( * ) Notice: Subject to any disclaimer, the term of this patent is extended or adjusted under 35 U.S.C. 154(b) by 169 days.

(21) Appl. No.: 15/178,993

(22) Filed: Jun. 10, 2016

(65) Prior Publication Data

US 2017/0076143 A1 Mar. 16, 2017

Related U.S. Application Data

(60) Provisional application No. 62/174,134, filed on Jun. 11, 2015.

(51) Int. Cl.
*G06K 9/00* (2006.01)
*G06K 9/62* (2006.01)

(52) U.S. Cl.
CPC ......... *G06K 9/00288* (2013.01); *G06K 9/627* (2013.01); *G06K 9/6232* (2013.01); *G06K 9/6249* (2013.01); *G06K 9/6282* (2013.01); *G06K 9/6286* (2013.01); *G06K 2009/00328* (2013.01)

(58) Field of Classification Search
CPC ............ G06K 9/00288; G06K 9/6232; G06K 9/6249; G06K 9/627; G06K 9/6282; G06K 9/6286
See application file for complete search history.

(56) References Cited

U.S. PATENT DOCUMENTS 9,141,885 B2 * 9/2015 Yang .................... G06K 9/4642

OTHER PUBLICATIONS

A. Angelova, Y. Abu-Mostafa, and P. Perona in 2005 entitled "Pruning training sets for learning of object categories," In Proc. IEEE Computer Society Conf. On Computer Vision and Patt. Recn. (8 pages).
A. Criminisi and J. Shotton in 2013 entitled "Decision Forests for Computer Vision and Medical Image Analysis," Springer (15 pages).
(Continued)

*Primary Examiner* — Duy M Dang
(74) *Attorney, Agent, or Firm* — Michael Best Friedrich LLP

(57) ABSTRACT

Methods and systems for large-scale face recognition. The system includes an electronic processor to receive at least one image of a subject of interest and apply at least one subspace model as a splitting binary decision function on the at least one image of the subject of interest. The electronic processor is further configured to generate at least one binary code from the at least one splitting binary decision function. The electronic processor is further configured to apply a code aggregation model to combine the at least one binary codes generated by the at least one subspace model. The electronic processor is further configured to generate an aggregated binary code from the code aggregation model and use the aggregated binary code to provide a hashing scheme.

17 Claims, 5 Drawing Sheets

(56) References Cited

OTHER PUBLICATIONS

A. Gionis, P. Indyk, and R. Molwani in 1999 entitled "Similarity search in high dimensions via hashing," In Proc. of International Conference on Vary Large Data Bases, pp. 518-529.

A. Khosla, W. A. Bainbridge, A. Torralba, and A. Oliva in 2013 entitled "Modifying the memorability of face photographs," In Proc. International Conference of Computer vision, pp. 3201-3207.

A. Krause, A. Singh, and C. Guestrin in 2008 entitled "Near-optimal sensor placements in Gaussian processes: Theory, efficient algorithms and empirical studies," Journal of Machine Learning Research, (9):235-284.

B. Kulis and K. Grauman.in 2009 entitled "Kernelized locality-sensitive hashing for scalable image search," In Proc. International Conference on Computer vision, pp. 2130-2137.

C. Strecha, A. Bronstein, M. Bronstein, and P. Fu. Ldahash in 2012, "Improved matching with smaller descriptors," IEEE Trans. on Patt. Anal. and Mach. Intell., 34(1):66-78.

D. Chen, X. Cao, F. Wen, and J. Sun in 2013 entitled "Blessing of dimensionality: High-dimensional feature and its efficient compression for face verification," In Proc. CVPR, pp. 3025-3032.

D. Zhang, J. Wang, D. Cai, and J. Lu in 2010 entitled "Selftaught hashing for fast similarity search," In Proc. of International Conference on Research and Development in Information Retrieval, pp. 19-23.

G. B. Huang, M. Ramesh, T. Berg, and E. Lerned-Miller, in Oct. 2007 entitled "Labeled faces in the wild: A database for studying face recognition in unconstrained environments," Technical Report 07-49, University of Massachusetts, Amherst, pp. 1-11.

J. Masci, A. M.Bronstein, M. M. Bronstein, P. Sprechmann, and G. Sapiro in Apr. 2014 entitled "Sparse similarity-preserving hashing," In International Conference on Learning Representations, pp. 1-13.

J. Masci, M. M. Bonstein, A. M. Bronstein, and J. Schmidhuber in 2014 entitled "Multimodal similarity-preserving hashing," IEEE Trans. on Patt. Anal. and Mach. Intell., 36(4):824-830.

J. R. Quinlan in 1993 entitled "C4.5: Programs for Machine Learning," Morgan Kaufmann Publishers Inc (4 pages).

K. Grauman and R. Fergus in 2013 entitled "Learning binary hash codes for large-scale image search," In Machine Learning for Computer Vision, pp. 49-87.

G. Nemhauser, L. Wolsey, and M. Fisher in 1978 entitled "An analysis of approximations for maximizing submodular set functions," Mathematical Programming, 14(1):265-294.

L. Breiman in 2001 entitled "Random forests," Machine Learning, 45(I):5-32.

L. Wolf, T. Hassner, and I. Maoz in 2011 entitled "Face recognition in unconstrained videos with matched background similarity." In Proc. IEEE Computer Society Conf. on Computer Vision and Patt. Recon, pp. 529-534.

M. Aharon, M. Elad, and A. Bruckstein in Nov. 2006 entitled "k-SVD: An algorithm for designing overcomplete dictionaries for sparse representation," IEEE Trans. on Signal Processing. 54(11):4311-4322.

M. E. Hellam and J. Raviv in 1979 entitled "Probability of error, equivocation, and the Chernoff bound," IEEE Trans. on Info. Theory, 16:368-372.

M. Goemans and D. Williamson in 1995 entitled "Improved approximation algorithms for maximum cut and satisfiability problems using semidefinite programming," J.ACM, 42(6):1115-1145.

M. Norouzi, D. J. Fleet, and R. Salakhutdinov in 2012 entitled "Hamming distance metric learning," In Advances in Neural Information Processing Systems, pp. 1-9.

N. Kumar, A C. Berg, P. N. Belhumeur, and S. K. Nayar in Oct. 2009 entitled "Attribute and simile classifiers for face verification," In Proc. International Conference on Computer vision, pp. 365-372.

N. Kumar, P. N. Belhumeur, and S. K. Nayar in Oct. 2008 entitled "Facetracer: A search engine for large collections of images with faces." In Proc. European Conference on Computer Vision, pp. 1-14.

N. Rasiwasia, J. Costa Pereira, E. Coviello, G. Doyle, G. R. Lanckriet, R.Levy, and N. Vasconcelos in 2010 entitled "A new approach to cross-modal multimedia retrieval," In Proceedings of the International Conference on Multimedia, p. 1-10.

Q. Qiu, Z. Jiang, and R. Chellappa in Nov. 2011 entitled "Sparse dictionary-based representation and recognition of action attributes," In Proc. International Conference on Computer vision, pp. 707-714.

Q. Qui, V. Patel, and R. Chellappa in 2014 entitled "Information-theoretic dictionary learning for image classification," IEEE Trans. on Patt. Anal. and Mach. Intell., 36(11):2173-2184.

W. Liu J. Wang, R. Ji, Y. Jiang, and S. Chang. In Jun. 2012 entitled "Supervised hashing with kernels," In Proc. IEEE Computer Society Conf. on Computer Vision and Patt. Recn, pp. 2074-2081.

W. Liu, J. Want, and S. Chang in 2011 entitled "Hashing with graphs," In International Conference on Machine Learning, pp. 1-8.

Y. Sun, X. Wang, and X. Tang in 2014 entitled "Deep learning face representation by joint identificationverification," In Proc. NIPS, pp. 1-9.

Y. Taigman, M. Yang, M. Ranzato, and L. Wolf in 2014 entitled "Deepface: Closing the gap to human-level performance in face verification," In Proc. CVPR,pp. 1701-1708.

Y. Weiss, A. Torralba, and R. Fergus in 2009 entitled "Spectral hashing," In Advances in Neutral Information Processing Systems, pp. 1-8.

* cited by examiner

1 MALE
2 ASIAN
3 WHITE
4 BLACK
5 BABY
6 CHILD
7 YOUTH
8 MIDDLE AGED
9 SENIOR
10 BLACK HAIR
11 BLOND HAIR
12 BROWN HAIR
13 BALD
14 NO EYEWEAR
15 EYEGLASSES
16 SUNGLASSES
17 MUSTACHE
18 SMILING
19 FROWNING
20 CHUBBY
21 BLURRY
22 HARSH
23 LIGHTING FLASH
24 SOFT LIGHTING
25 OUTDOOR
26 CURLY HAIR
27 WAVY HAIR
28 STRAIGHT HAIR
29 RECEDING HAIRLINE
30 BANGS
31 SIDEBURNS
32 FULLY VISIBLE FOREHEAD
33 PARTIALLY VISIBLE FOREHEAD
34 OBSTRUCTED FOREHEAD
35 BUSHY EYEBROWS
36 ARCHED EYEBROWS
37 NARROW EYES
38 EYES OPEN
39 BIG NOSE
40 POINTY NOSE
41 BIG LIPS
42 MOUTH CLOSED
43 MOUTH SLIGHTLY OPEN
44 MOUTH WIDE OPEN
45 TEETH NOT VISIBLE
46 NO BEARD
47 GOATEE
48 ROUND JAW
49 DOUBLE CHIN
50 WEARING HAT
51 OVAL FACE
52 SQUARE FACE
53 ROUND FACE
54 COLOR PHOTO
55 POSED PHOTO
56 ATTRACTIVE MAN
57 ATTRACTIVE WOMAN
58 INDIAN
59 GRAY HAIR
60 BAGS UNDER EYES
61 HEAVY MAKEUP
62 ROSY CHEEKS
63 SHINY SKIN
64 PALE SKIN
65 5 O'CLOCK SHADOW
66 STRONG NOSE-MOUTH LINES
67 WEARING LIPSTICK
68 FLUSHED FACE
69 HIGH CHEEKBONES
70 BROWN EYES
71 WEARING EARRINGS
72 WEARING NECKTIE
73 WEARING NECKLACE

FIG. 3

SYSTEMS AND METHODS FOR LARGE SCALE FACE IDENTIFICATION AND VERIFICATION

RELATED APPLICATIONS

This application claims priority to U.S. Provisional Application No. 62/174,134, filed Jun. 11, 2015, the entire content of which is incorporated by reference herein.

FEDERAL FUNDING LEGEND

This invention was made with Government Support under Federal Grant No. A001413001 awarded by the AFOSR. The Government has certain rights to this invention.

FIELD

Embodiments relate to systems and methods for face identification and verification.

BACKGROUND

Automatic face recognition in unconstrained conditions is subject to pose, expression, and illumination variability. Automatic face recognition is, perhaps, among the most challenging machine vision tasks and has far-reaching applications—ranging from entertainment to security. Broadly, face recognition tasks can be categorized as one-to-one verification (e.g., a biometric automated teller machine authenticating the claimed identity of a cardholder), and one- or few-to-many identification (e.g., finding one or a few black-listed persons in a large crowd).

While the past few decades of research showed a steady improvement in face recognition accuracy, achievements of the last few years have been more rapid. On one-to-one face verification tasks, modern learning techniques achieve performance only a notch inferior to that of humans. These approaches generate high-dimensional features decreasing the intra-subject variance due to pose, expression, illumination, and other factors, while increasing the inter-subject variance.

More modest achievements have been made in the one- and few-to-many category.

SUMMARY

In one- and few-to-many identification a challenge lies in the need to perform queries on high-dimensional features. Many efficient retrieval techniques scalable to high-dimensional data are based on supervised variants of locality-sensitive hashing. However, existing hashing techniques require massive supervision (use of category information to enhance the effectiveness of learning-based hashing) that is impractical in many face recognition tasks. Also, a small rejection radius is required to achieve fast retrieval. This leads to high false negative rates that might be acceptable for image or multimedia search, but are unusable for face identification.

In contrast, systems and methods described herein demonstrate an indexing technique that addresses requirements specific to face recognition. In one example, a hashing procedure for representing and indexing large-scale collections of human faces with high precision and recall at sub-linear (practically, sub-millisecond) retrieval time is described. The technique is based on a combination of random forest and information-theoretic tree aggregation which, to the knowledge of the inventors, has never before been used for semantic hashing.

Certain hashing schemes described herein achieve competitive performance when trained for less than an hour on standard desktop hardware on a modestly sized training set (about 6000 labeled faces)—regimes that are beyond the reach of, for example, deep learning techniques that normally require massive supervision and lengthy training times. Also, the evaluation time per query is smaller compared to deep neural networks, being in the sub-millisecond range on standard hardware.

While in some embodiments the systems and methods are designed by large-scale one- or few-to-many face identification, certain embodiments of systems and methods described herein show that the representation created by the hashing codes increases the performance of the raw feature on one-to-one face verification tasks, achieving competitive performance in the 97% range on the Pubfig dataset (described by N. Kumar, A. C. Berg, P. N. Belhumeur, and S. K. Nayar in October 2009 entitled "Attribute and simile classifiers for face verification," In *Proc. International Conference on Computer vision*, incorporated herein by reference). This is despite using implementation of face feature extraction that is less powerful that the recently proposed Deepface (described by Y. Taigman, M. Yang, M. Ranzato, and L. Wolf in 2014 entitled "Deepface: Closing the gap to human-level performance in face verification," In Proc. CVPR, pages 1701-1708, incorporated herein by reference), DeepID2 (described by Y. Sun, X. Wang, and X. Tang in 2014 entitled "Deep learning face representation by joint identification-verification," In *Proc. NIPS*, incorporated herein by reference) and high-dimensional LPB features (described by D. Chen, X. Cao, F. Wen, and J. Sun in 2013 entitled "Blessing of dimensionality: High-dimensional feature and its efficient compression for face verification," In *Proc. CVPR*, pages 3025-3032, incorporated herein by reference).

The present disclosure provides, in part, techniques that are based on a combination of random forest to produce compact hash code representation, and information-theoretic tree aggregation; and requires neither massive supervision nor lengthy training times typical of techniques such as deep learning. The systems and methods provided herein also demonstrate that the resulting representation achieves performance competitive with the state-of-the-art approaches in one-to-one face verification tasks, and demonstrate how it can also be used for cross-representation retrieval.

One aspect of the present disclosure provides a method for large-scale face recognition comprising: receiving, with an electronic processor, at least one image of a subject of interest; applying, with the electronic processor, at least one subspace model as a splitting binary decision function on the at least one image of the subject of interest; generating, with the electronic processor, at least one binary code from the at least one splitting binary decision function; applying, with the electronic processor, a code aggregation model to combine the at least one binary codes generated by the at least one subspace model; generating, with the electronic processor, an aggregated binary code from the code aggregation model; and using the aggregated binary code to provide a hashing scheme.

Another aspect of the present disclosure provides an image processing system comprising an electronic processor configured to receive at least one image of a subject of interest; apply at least one subspace model as a splitting binary decision function; generate at least one binary code from the at least one splitting binary decision function; apply a code aggregation model to combine the at least one binary codes generated by the at least one subspace model, generate an aggregated binary code from the code aggregation model and use the aggregated binary code to provide hashing scheme. Other aspects of the present disclosure will become apparent from the subject matter described and illustrated herein.

BRIEF DESCRIPTION OF THE DRAWINGS

The accompanying figures together with the detailed description below, are incorporated in and form part of the specification, and serve to further illustrate embodiments described herein, including various principles and advantages of those embodiments.

FIG. 3 is a list of attributes representing a face in accordance with one embodiment.

DETAILED DESCRIPTION

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement embodiments of the invention. For example, "mobile device" and "computing device" as used in the specification may include one or more electronic processors, one or more memory modules including non-transitory computer-readable medium, one or more input/output interfaces, and various connections (e.g., a system bus) connecting the components.

Figure 1:
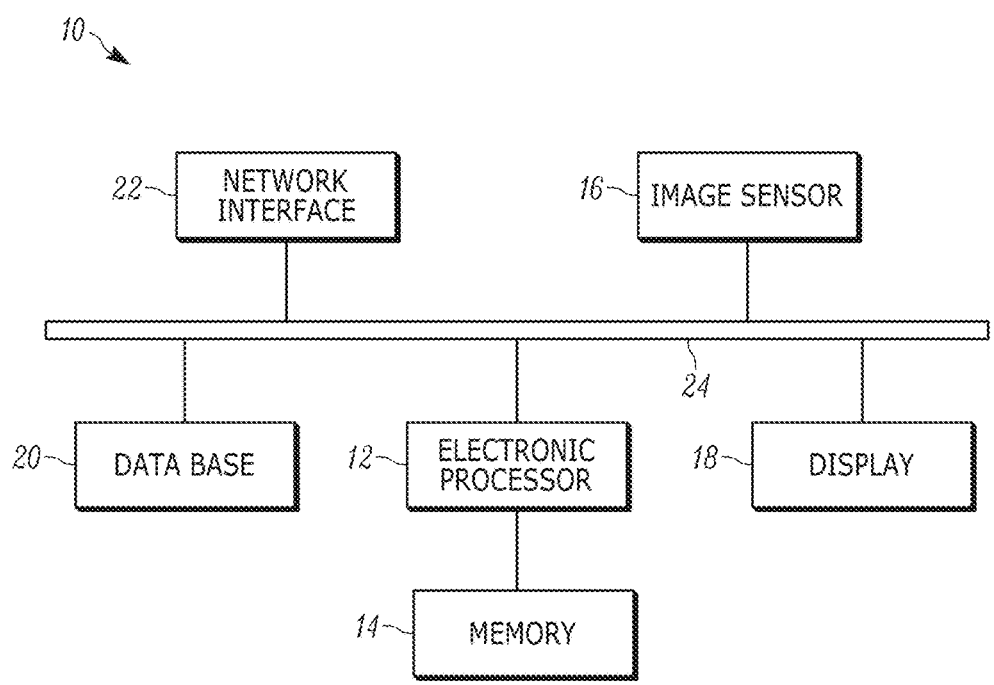
FIG. 1 schematically illustrates an image processing system according to some embodiments.

As noted above, embodiments provide automated systems and methods for large-scale face representation using a hashing scheme. For example, FIG. 1 schematically illustrates an image processing system 10 according to some embodiments. The image processing system 10 includes an electronic processor 12 (e.g., a microprocessor, application-specific integrated circuit ("ASIC"), or other suitable electronic device), a memory 14, an image sensor 16 (e.g., a digital still or video camera), a display device 18, a database 20, a network interface 22 that is coupled to an input/output (I/O) interface 24. In some embodiments, the image processing system 10 includes additional, fewer, or different components. For example, in some embodiments, the image processing system 10 includes multiple electronic processors, memories, display devices, or combinations thereof. Also, in some embodiments, the image processing system 10 as described in the present application may perform additional functionality than the image representation functionality described in the present application.

The memory 14 includes non-transitory, computer-readable memory, including, for example, read only memory ("ROM"), random access memory ("RAM"), or combinations thereof. The memory 14 stores program instructions (e.g., one or more software applications) and images. The electronic processor 12 is configured to retrieve instructions from the memory 14 and execute, among other things, the instructions to perform image processing, including the methods described herein. The display device 18 is an output device that presents visual information and may include a light-emitting diode ("LED") display, a liquid crystal display, a touchscreen, and the like.

In some embodiments, the electronic processor 12, the image sensor 16, and the display device 18 are included in a single computing device (e.g., within a common housing), such as a laptop computer, tablet computer, desktop computer, smart telephone, smart television, smart watch or other wearable, or another suitable computing device. In these embodiments, the electronic processor 12 executes a software application (e.g., a "mobile application" or "app") that is locally stored in the memory 14 of the computing device to perform the methods described herein. For example, the electronic processor 12 may execute the software application to access and process data (e.g., images) stored in the memory 14. Alternatively or in addition, the electronic processor 12 may execute the software application to access data (e.g., images) stored external to the computing device (e.g., on a database 20 accessible over a communication network). The electronic processor 12 may output the results of processing the accessed data (i.e., a composite image) to the display device 18 included in the computing device.

In other embodiments, the electronic processor 12, the image sensor 16, the memory 14, or a combination thereof may be included in one or more separate devices. For example, in some embodiments, the image sensor 16 may be included in a smart telephone configured to transmit an image captured by the image sensor 16 to a server including the memory 14 over a wired or wireless communication network or connection. In this configuration, the electronic processor 12 may be included in the server or another device that communicates with the server over a wired or wireless network or connection. For example, in some embodiments, the electronic processor 12 may be included in the server and may execute a software application that is locally stored on the server to access and process data as described herein. In particular, the electronic processor 12 may execute the software application on the server, which a user may access through a software application, such as a browser application or a mobile application) executed by a computing device of the user. Accordingly, functionality provided by the image processing system 10 as described below may be distributed between a computing device of a user and a server remote from the computing device. For example, software a user may execute a software application (e.g., a mobile app) on his or her personal computing device to communicate with another software application executed by an electronic processor included in a remote server.

Regardless of the configuration of the image processing system 10, the image processing system 10 is configured to execute large-scale face representation and hashing. One aspect of the present disclosure provides a method for large-scale face representation comprising: acquiring at least one image of an object of interest; applying at least one subspace model technique as a splitting binary decision function; creating at least one binary code from the one or more splitting binary decision functions; applying a code aggregation model to combine the one or more binary codes produced by the one or more set of subspace models; generating a binary code for face representation from the code aggregation model and using the binary code in a hashing scheme. Another aspect of the present disclosure provides a method for large-scale face representation comprising executing the above detailed hashing scheme and performing face recognition. Another aspect of the present disclosure provides a method for large-scale face representation comprising executing the above detailed hashing scheme and performing face verification.

Existing similarity-preserving hashing schemes have several limitations. For example, Let $x \subset R^{72}$ be the feature space in which every point represents a face, and let c: $X \rightarrow \{1, \ldots, K\}$ represent the underlying subject identities (classes). Since direct comparison of points $R^{71}$ does not scale well, many applications requiring large-scale content-based retrieval and approximate nearest search rely on similarity-preserving hashing techniques. These methods learn an embedding function h: $X \rightarrow H^w$ mapping the original data points into m-dimensional binary strings, thus producing compact representations that can be compared in constant or sub-linear time. Such an embedding can be considered as a hashing function on the data, which translates the underlying similarity into the similarity of the codes under the Hamming metric, namely $d_H(h(x),h(x')) \approx d_x(x,x')$. Examples of recent similarity-preserving hashing methods include Locality-Sensitive Hashing (LSH) described by A. Gionis, P. Indyk, and R. Molwani in 1999 entitled "Similarity search in high dimensions via hashing," In *Proc. Of International Conference on Vary Large Data Bases*, incorporated herein by reference, and its kernelized version (KLSH) described by B. Kulis and K. Grauman. in 2009 entitled "Kernelized locality-sensitive hashing for scalable image search," In *Proc. International Conference on Computer vision*, incorporated herein by reference, Spectral Hashing (SH) described by Y. Weiss, A. Torralba, and R. Fergus in 2009 entitled "Spectral hashing," In *Advances in Neutral Information Processing Systems*, incorporated herein by reference, Sparse Hash described by J. Masci, A. M. Bronstein, M. M. Bronstein, P. Sprechmann, and G. Sapiro in April 2014 entitled "Sparse similarity-preserving hashing," In *International Conference on Learning Representations*, Banff, Canada, incorporated herein by reference, Kernel-based Supervised Hashing (KSH) described by W. Lie, J. Wang, R. Ji, Y. Jiang, and S. Chang. In June 2012 entitled "Supervised hashing with kernels," In *Proc. IEEE Computer Society Conf. on Computer Vision and Patt. Recn.*, incorporated herein by reference, Anchor Graph Hashing (AGH) described by W. Liu, J. Want, and S. Chang in 2011 entitled "Hashing with graphs," In *International Conference on Machine Learning*, incorporated herein by reference, and Self-Taught Hashing (STH) described by D. Zhang, J. Wang, D. Cai, and J. Lu in 2010 entitled "Self-taught hashing for fast similarity search," In *Proc. Of International Conference on Research and Development in Information Retrieval*, incorporated herein by reference.

The overwhelming majority of similarity-preserving hashing techniques solve a supervised learning problem, in which the embedding h is sought over a family of parametric functions to minimize the distance $d_H(h(X),h(X^+))$ for pairs of knowingly dissimilar points, $c(x) \neq c(x^\mp)$, referred to as positives, while at the same time maximizing the distance $d_H(h(X),h(X^-))$ on pairs of knowingly dissimilar points, $c(x) \neq c(x^-)$, referred to as negatives. More precisely, each rejection radius r defines the false positive and the false negative rates, $$FPR = P(d_H(h(x),h(x')) \leq r | c(x) \neq c(x')),$$

$$FNR = P(d_H(h(x),h(x')) > r | c(x) = c(x')),$$

or precision and recall, $$Pr = \frac{TP}{TP + FP} \text{ and } Re = \frac{TP}{TP + FN}$$

$$Pr = \frac{TP}{TP + FP} \text{ and } Re = \frac{TP}{TP + FN'}$$

where, the true positive $TP=(1-FNR) \cdot P$, false positive $FP=FPR \cdot N$, and false negative $FN=FNR \cdot P$ probabilities depend on the prior positive and negative probabilities, $P=P(c(x)=c(x'))$ and $N=1-P$. At training, a weighted aggregate of average $d_H(h(x),h(x^+))$ and $d_H(h(x),h(x^-))$ is minimized on the training data, with the weight selected to achieve desired tradeoff between FPR and NFR or precision and recall.

Such approaches require massive supervision and produce relatively poor performance when little training data are available. For this reason, they are less suitable for face identification tasks, where usually only few samples are available for each subject in the black list. The proposed face hash technique presented in the sequel is designed with this requirement in mind. Instead of supervising the training by pairs or triplets of positive and negative points, we use the identity (class) labels, requiring subjects from the same class to be mapped to the same hash code, and different subjects to be represented by distinct codes. We also rely on the fact that the Euclidean distance in the feature space is meaningful locally, and use subspace clustering to allow unseen faces from the same class to be mapped to the same code.

The selection of code length m and the rejection radius r in a similarity-preserving hash also has an important influence on the tradeoff between precision and recall (or FPR and FNR). Increasing the number of bits m increases the precision (decreases FPR), since a higher-dimensional embedding space allows representing more complicated decision boundaries. At the same time, with the increase of m, the normalized volume of the ball $B_r$ containing the positives decays exponentially fast, a phenomenon known as the curse of dimensionality, resulting in a rapid decrease of the recall (increase of the FNR). This is a well-documented phenomenon that affects all hashing techniques described by K. Grauman and R. Fergus in 2013 entitled "Learning binary hash codes for large-scale image search," In *Machine Learning for Computer Vision*, pages 49-87, incorporated herein by reference. For instance, in the context of local-sensitive hashing, it can be shown that the collision probability between two points decreases exponentially with the code-length described by M. Goemans and D. Williamson in 1995 entitled "Improved approximation algorithms for maximum cut and satisfiability problems using semidefinite programming," *J.ACM*, 42(6):1115-1145, incorporated herein by reference. Furthermore, increasing m slows down the retrieval.

The low recall typical to long codes can be improved by increasing the rejection radius r. However, this comes at the expense of increased query time, since the search complexity directly depends on the rejection radius r. For r=0 (collision), a look-up table (LUT) is used: the probe code is fed into the LUT, containing all entries in the database having the same code. The complexity is O(m), independent of the gallery size N, but often with a large constant. For small r (partial collision), the search is done as for r=0 using perturbation of the probe: at most r bits of the probe code are changed, and then it is fed into the LUT. The final result is the union of all the retrieved results. Complexity in this case is $$O\left(\binom{r}{m}\right).$$

For large radii it is often cheaper in practice to use exhaustive search with complexity O(N) (for typical code lengths and database sized used in vision applications, using r>3 is slower than brute-force search [Grauman (2013)]. Consequently, practical retrieval based on similarity-preserving hashing schemes suffers from a fundamental limitation of the precision-recall-speed (or FPR-FNR-speed) tradeoff: one has to choose between fast retrieval (small r and m, resulting in low recall/high FNR), or high recall/low FPR (large m, low recall/high FNR, and slow retrieval).

In "Sparse similarity-preserving hashing," In *International Conference on Learning Representations*, Banff, Canada, April, 2014, the authors proposed to control the volume of the embedding space by restricting the hash codes to be sparse. Compared to its "dense" counterpart, and m-bit k-sparse hash enjoys from the high precision (low FPR) typical for long hashes, while having higher recall (lower FNR) roughly comparable to that of a dense hashing scheme with $$\log_2\binom{m}{s} = O(s \log_2 m)$$

bits (which has the same number of degrees of freedom of the m-bit sparse hash). The authors presented a massively supervised hashing technique based on deep learning that achieved very high recall at negligible expense of precision for rejection radius r=0. The face hash technique presented in the sequel is based on this observation and makes the code sparse by design.

The systems and methods described herein overcome these limitations, in part, through the development of a hashing scheme referred to as the face hash scheme.

In what follows, we construct the face hash similarity-preserving hashing technique designed specifically for efficient large-scale face identification, as highlighted in the previous section. The technique is based on random forest [Breiman (2001), Criminisi (2013)]—an ensemble of binary decision trees, where each tree consists of hierarchically connected split (internal) nodes and leaf (terminal) nodes. Each split node corresponds to a weak learner, and evaluates each arriving data point sending it to the left or right child based on the weak learner binary outputs. Each leaf node stores the statistics of the data points that arrived to it during training. During testing, each decision tree returns a class posterior probability for a test sample, and the forest output is often defined as the average (or otherwise aggregated distribution) of the tree posteriors.

Following the random forest literature [6], in this paper, we specify a maximum tree depth d to limit the size of a tree, which is different from algorithms like C4.5 (described by J. R. Quinlan in 1993 entitled "*C4.5: Programs for Machine Learning*," Morgan Kaufmann Publishers Inc., incorporated herein by reference) that grow the tree relying on other termination criteria; we also avoid post-training operations such as tree pruning. Thus, a tree of depth d consists of $2^d-2$ tree nodes, excluding the root node, indexed in the breadth-first order.

During the training phase, we introduce randomness into the forest through a combination of random training set sampling and randomized node optimization, thereby avoiding duplicate trees. As discussed in [4, 6], training each tree with a different randomly selected set decreases the risk of overfitting, improves the generalization of classification forests, and significantly reduces the training time. When given more than two classes, we further randomly partition the classes arriving at each binary split node into two categories.

The hash is constructed as follows: Each data point is pushed through a tree until reaching the corresponding leaf node. We simply set '1' for the visited leaf, and '0' for the rest, obtaining a $(2^{d-1})$-bit hash code, always containing exactly one 1. In a random forest consisting of M trees of the depth d, each point is simultaneously pushed through all trees to obtain M $(2^{d-1})$-bit hash codes.

This hashing scheme has several obvious characteristics and advantages: First, both the training and the hashing processes can easily be done in parallel to achieve high computational efficiency on modern parallel CPU or GPU hardware. Second, multiple hash codes obtained from a forest, each from an independently trained tree, have the potential to inherit the boosting effect of the random forest, i.e., increasing the number of trees increases accuracy (sublinearly) described by A. Criminisi and J. Shotton in 2013 entitled "*Decision Forests for Computer Vision and Medical Image Analysis*," Springer, incorporated herein by reference. Finally, the scheme guarantees 1-sparsity for hash codes from each tree.

However, in classification, for which the forest was originally designed, an ensemble posterior is obtained by averaging from a large number of trees, thus boosting the classification accuracy (described by L. Breiman in 2001 entitled "Random forests," *Machine Learning*, 45(1):5-32, incorporated herein by reference), and no confident class posteriors are required for individual trees. This situation has no direct analogy in the case of hashing. Due to the lack of confident class posteriors in individual trees, we obtain highly inconsistent hashes from each individual tree for the same class data. It is also not obvious how to combine hashes from different trees given a target code length. The inconsistency of the hash codes prevents standard random forest from being directly adopted for hashing, being such codes critical for large-scale retrieval tasks. Such inconsistency becomes more severe when increasing the tree depth, as more leaf nodes are available to distribute the same class samples. This problem can not be solved by simply increasing the number of trees for longer total bit length. For example, if 4-bit inconsistency is allowed for a 64-bit hash code, the Hamming ball already contains (64/4)=635,376 codes. A principled way is required to combine hashes from each tree. One can choose to combine hashes from different trees simply through concatenating, averaging and thresholding, or voting. However, the principles behind those heuristics are not obvious.

In what follows, we address these two problems. First, we use a subspace model as the splitting function for the random forest. Note that a class may not be assigned a unique code due to limited leaf availability. However, each class shares code with different classes in different trees due to the underlying node randomness models, which allows the information-theoretic aggregation process at the second stage to produce a nearly-optimal unique code for each class.

Splitting Functions

Consider the n-dimensional features belonging to just two classes, which for simplicity are denoted as positive and negative. We stack the training data points as columns of the matrices $X^+$ and $X^-$, respectively. If sufficiently good features are used, it is reasonable to assume that each of the classes will belong to a low-dimensional subspace, the distances from which can be used to classify previously unseed points. We use k-SVD (described by M. Aharon, M. Elad, and A. Bruckstein in November 2006 entitled "k-SVD: An algorithm for designing overcomplete dictionaries for sparse representation," *IEEE Trans. On Signal Processing*. 54(11):4311-4322, incorporated herein by reference) to learn a pair of dictionaries $D^\pm$, for each of the two classes, by minimizing $$\min_{D_\pm, Z^i} \| X^\pm - D^\pm Z^\pm \| \quad \text{s.t.} \quad \| z_i^\pm \|_0 \leq l, \tag{1}$$

where the $l_a$ pseudonorm $\|Z_i^\pm\|_0$ counts the number of non-zero elements in each column of $Z_i^\pm$ and l controls the subspace dimension. To introduce node randomness and thereby avoid duplicate trees at training, we randomly partition training subjects arriving at each split node into two classes.

At testing, given a data point x, the splitting function is evaluated by first projecting x onto both dictionaries and evaluating the projection errors $$e^\pm(x) = \arg_{Z_\pm}^{min} \| D^\pm z^\pm - X \|_2 = \| P^\pm x \|_2 \tag{2}$$

Where $P^\pm = D^\pm (D^{\pm T} D^\pm)^{-1} D^{\pm T}$ are the n×n projection matrices. The point is sent to the left subtree if $e^-(x) < e^+(x)$, and to the right subtree otherwise. In practice, we only store the projection matrices $P^\pm$ at each split node.

It is worthwhile noting that subspace clustering naturally extends to a semi-supervised regime where subject labels are only available for a subset of the training feature vectors, which is crucial in some fact recognition applications.

Code Aggregation

Training each random tree with the subspace model tends to produce consistent hashes for similar data points. However, a single tree does not have sufficient capacity to assign distinct codes to different subjects; hence, aggregation of codes from multiple trees is necessary. Consider a random forest consisting of M trees of depth d; the hash codes obtained for N training samples are denoted as $\{B_i\}_{i=1}^M$, with the $B_i \in \{0,1\}^{\{2^d-1\} \times N}$ being the codes generated from the i-th tree, henceforth denoted as code blocks. Given the target hash code length m, our objective is to concatenate the "best" $K \leq m/(2^d-1)$ code blocks $B_J = [B_{i_1}; \ldots; B_{i_k}]$ from trees indexed by $J = \{1 \leq i_1 < \ldots < i_k \leq M\}$. In what follows, we describe nearly optimal code aggregation based on information-theoretic principles. Note that the index J is learned offline and is fixed at testing.

In the absence of class labels, we maximize the mutual information between the selected and the remaining codes, $$\max_J I(B_J; B_{J^c}) \tag{3}$$

The objective of (3) enjoys the submodularity (diminishing return) property, i.e., adding an element to a smaller set helps more than adding it to a larger set. While maximization submodular functions is in general NP-hard, motivated by A. Krause, A. Singh, and C. Guestrin in 2008 entitled "Near-optimal sensor placements in Gaussian processes: Theory, efficient algorithms and empirical studies," *Journal of Machine Learning Research*, (9):235-284, incorporated herein by reference, and Q. Qui, V. Patel, and R. Chellappa in 2014 entitled "Information-theoretic dictionary learning for image classification," *IEEE Trans. On Patt. Anal. And Mach. Intell.*, 36(11):2173-2184, incorporated herein by reference, we propose a simple greedy algorithm to approximate the solution of (3). We start with an empty index $J = \emptyset$, and iteratively choose the next best code block index $i \in J^c$ which provides a maximum information gain, $$\max_{i \in J^c} I(B_{J \cup \{i\}}; B_{J^c \setminus \{i\}}) - I(B_J; B_{J^c}) = \max_{i \in J^c} H(B_i | B_J) - H(B_J; B_{J^c \setminus \{i\}}), \tag{4}$$

where, H(•|•) denotes the conditional entropy. Intuitively, the first term $H(B_i|B)$ forces $B_i$ to be most different from the already selected codes $B_J$, and the second term $-H(B_i|B_{J^c \setminus \{i\}})$ forces $B_i$ to be most representative among the remaining codes. By defining a covariance matrix with the i j-th entry equal to exp $$\left(-\frac{1}{N}d_H(B_i, B_j)\right),$$

with $d_H$, being the Hamming distance, (4) can be efficiently evaluated in a closed form as described by Q. Qiu, Z. Jiang, and R. Chellappa in November 2011 entitled "Sparse dictionary-based representation and recognition of action attributes," In *Proc. International Conference on Computer vision*, incorporated herein by reference. Near-optimality of such a greedy approximation has been proved in Krause (2008) and G. Nemhauser, L. Wolsey, and M. Fisher in 1978 entitled "An analysis of approximations for maximizing submodular set functions," *Mathematical Programming*, 14(1):265-294, incorporated herein by reference.

When the class labels $c=(c(x_1), \ldots, c(x_N))$ are available for the N training samples, an upper bound on the Bayes error over hashing codes $B_J$ is given by $\frac{1}{2}(H(c)-I(B_J; c))$, with H and I denoting, respectively, entropy and mutual information described by M. E. Hillam and J. Raviv in 1979 entitled "Probability of error, equivocation, and the Chernoff bound," *IEEE Trans. On Info. Theory*, 16:368-372, incorporated herein by reference. This bound is minimized when $I(B_J;c)$ is maximized. Thus, discriminative hash codes can be obtained by maximizing the mutual information between selected codes and the labels, $$\text{MAX}_J I(B_J; C) \tag{5}$$

Similarly to the unsupervised case, (5) is maximized using a greedy algorithm initializing $J=\emptyset$, and iteratively choosing the next best code block index $i \in J^c$ that maximizes the information gain $$\text{MAX}_{i \in J^c} I(B_{J \cup \{i\}}; C) - I(B_J; C). \tag{6}$$

Here $I(B;c)$ is evaluated as $I(B;c)=H(B)-\Sigma_c p(c)H(B|c)$. Entropy measures here involve computation of probability density functions $p(B)$ and $p(B|c)$, which can both be efficiently computed by counting the frequency of unique codes in B. The number of unique codes is usually very small due to the learned subspace model.

The above unsupervised and supervised code aggregation regimes are unified by greedily maximizing $$\text{MAX}_{i \in J^c} I(B_{J \cup \{i\}}; B_{J^c \setminus \{i\}}) - I(B_J; B_{J^c}) + \lambda(I(B_{J \cup \{i\}}; c) - I(B_J; c)). \tag{7}$$

The first and last two terms are evaluated using different samples to exploit all labeled and unlabeled training data. The parameter $\lambda$ in (7) is estimated as the ratio between the maximal information gained from a code block to each respective criteria, i.e., $$\lambda = \frac{\max_i I(B_i; B_{J \setminus \{i\}})}{\max_i I(B_i; c)}$$

Exploiting the diminishing return property, only the first greedily selected code block based on (4) and (6) need to be evaluated leading to an efficient process of finding $\lambda$.

Applications

The following examples and applications are offered by way of illustration and not by way of limitation.

We present applications of face hash on large scale face retrieval, and face verification. To show the capability of face hash to handle big data, we merge multiple public face datasets into a large scale face database, which contains 0.7 million faces from around 30,000 different subjects. State-of-the-art methods compared include HDML (described by M. Norouzi, D. J. Fleet, and R. Salakhutdinov in 2012 entitled "Hamming distance metric learning," In *Advances in Neural Information Processing Systems*, incorporated herein by reference), LDA (described by C. Strecha, A. Bronstein, M. Bronstein, and P. Fu. Ldahash in 2012 entitled "Improved matching with smaller descriptors," *IEEE Trans. On Patt. Anal. And Mach. Intell.*, 34(1):66-78, incorporated herein by reference), KLSH [Kulis (2009)], SH [Weiss (2009)], AGH [Liu (2011)], and SM (N. Rasiwasia, J. Costa Pereira, E. Coviello, G. Doyle, G. R. Lanckriet, R. Levy, and N. Vasconcelos in 2010 entitled "A new approach to cross-modal multimedia retrieval," In *Proceedings of the International Conference on Multimedia*, incorporated herein by reference).

Face Datasets and Features

The Pubfig dataset [Kumar(2009)] contains 42,999 face images of 200 subjects collected from the internet, and these images are taken in completely uncontrolled situations without cooperation from subjects. The Pubfig dataset is similar to the LFW dataset [described by G. B. Huang, M. Ramesh, T. Berg, and E. Lerned-Miller, in October 2007 entitled "Labeled faces in the wild: A database for studying face recognition in unconstrained environments," Technical Report 07-49, University of Massachusetts, Amherst, incorporated herein by reference] in terms of large variations, but much deeper (on average 300 images per individual). We keep 5,992 faces in Pubfig for training (30 faces per subject), and the remaining 37,007 faces for testing.

We merge testing faces in Pubfig with multiple public face datasets, including LFW (140 overlap subjects with Pubfig are excluded) [Huang (October 2007)]. 10KUS (described by A. Khosla, W. A. Bainbridge, A. Torralba, and A. Oliva in 2013 entitled "Modifying the memorability of face photographs," In *Proc. International Conference of Computer vision*, incorporated herein by reference), FaceTracker (described by N. Kumar, P. N. Belhumeur, and S. K. Nayar in October 2008 entitled "Facetracer: A search engine for large collections of images with faces." In *Proc. European Conference on Computer Vision*, incorporated herein by reference), and WebFaces (described by A. Angelova, Y. Abu-Mostafa, and P. Perona in 2005 entitled "Pruning training sets for learning of object categories," In *Proc. IEEE Computer Society Conf on Computer Vision and Patt. Recn.*, incorporated herein by reference), for a 73,000 face database from 2,800 subjects. We have on average one or two faces per subject for these additional datasets. Then, we further merge this medium sized database with the YoutubeFace dataset (62 overlap subjects with Pubfig are excluded) (described by L. Wolf, T. Hassner, and I. Maoz in 2011 entitled "Face recognition in unconstrained videos with matched background similarity." In *Proc. IEEE Computer Society Conf. on Computer Vision and Patt. Recon.*, incorporated herein by reference) for a large scale face database, which contains 0.7 million faces from around 30,000 different subjects.

Several effective face representations were proposed recently to report close to human-level performance in face verification, e.g., attribute features [Kumar (2009)]. High-dimensional LBP [Chen(2013)], Deepface features [Taigman (2014)], and DeepID2 [Sun (2014)]. Due to lack of public code to these state-of-the-art features, we implement our own face feature extraction by following [Chen (2013)] to obtain 480-sized High-dimensional LBP feature vector for each face image. The training data used in feature learning consists of the Pubfig training data and an external dataset with no overlap subjects with both Pubfig and LFW. As LFW has 140 overlapping subjects with Pubfig out of 5749 subjects, our implementation of the high-dimensional LBP features reports 91.46% verification accuracy on LFW by discarding pairs with overlap subjects, and 91.38% on all pairs, which demonstrates that these features remain effective on unseen subjects. Though our results are inferior to the 95.17% reported in [Chen (2013)], our features serve as a reasonable baseline, and are used in all our experiments unless otherwise specified. Note that any state-of-the-art face features can be essentially adopted as inputs to the proposed face hash framework as we show later in the experiment combining the high-dimensional LBP and attribute features.

Large-Scale Face Retrieval

We now focus of the blacklist/whitelist scenario, by first "enrolling" in a list all 200 Pubfig subjects using training data, and then using the enrolled faces as queries to search for their remaining unseen faces in the large scale database containing 0.7 million faces. The above scenario generalizes to numerous real-world applications, such as searching for a list of suspects in hours of surveillance videos.

Results reported in Table 1 refer to an experiment in which we construct an index using 30 training faces per subject, and search among their unseen faces only. Performance of various indexing and retrieval methods is summarized using the mean precision, recall, and the F1 score (their harmonic average) for Hamming radius 0 and 2 hash lookup. Note that only small radius is relevant in large scale retrieval tasks. For the compared methods SH, KLSH, AGH1, AGH2, and LDAHash, we use the software provided by the authors. For face hash, we trained 64 depth-3 face hash trees setting the total code length to 36-bit and 48-bit. As each tree provides 4 bits, 9 and 12 trees were selected, respectively, using the proposed code aggregation scheme. Using 36-bit face hash codes, the average hashing time is about 34 microseconds, while the average query time is 0.2 milliseconds, with an unoptimized Matlab implementation. The proposed face hashshows significantly higher precision and recall compared to other state-of-the-art methods. FIG. 1 presents several examples of face queries.

In Table 2, we merge testing faces in Pubfig with the LFW, 10KUS, FaceTracker, and WebFaces for the total of 73,000 faces from 2,800 subjects. We use the face hash trees constructed for Table 1 to index these 73,000 faces, and perform the same retrieval experiment. In contrast to other hashing methods, face hash experiences only small performance degradation with the increased database size.

We further add the YoutubeFace dataset resulting in a total of 0.7 million faces. As reported in Table 3, face hash shows almost identical recall and an insignificant drop in precision. It is noted that, using 36-bit code length, face hash takes about 24 seconds to hash all 0.7 million faces, and 16 millisecods per query, with our unoptimized Matlab implementation.

Several deep learning based hashing methods were proposed recently, such as ANN Hashing (described by J. Masci, M. M. Bonstein, A. M. Bronstein, and J. Schmidhuber in 2014 entitled "Multimodal similarity-preserving hashing," *IEEE Trans. On Patt. Anal. And Mach. Intell.*, 36(4): 824-830, incorporated herein by reference), SparseHash [Masci (2014)], and HDML [Norouzi (2012)]. In particular, HDML reports excellent approximate nearest neighbor properties. In our context, we assume labels are only available for a small subset of data, which is often the case in face applications. When the number of labeled samples reduces to <100 per class, the retrieval performance of the deep learning based hashing algorithms degrades dramatically. The HDML software we obtained from the authors was designed on the MNIST dataset, containing 10 classes and 6000 training per class. Using 30 training samples per class, 36-bit HDML codes, produced from a multi-layer deep learning networks, only 63.00% precision and 4.41% recall at radius r=2 was obtained (as the provided HDML software failed to operate on datasets with more than 10 classes, we use only 10 subjects from Pubfig here). For the same experiment, face hash achieves 99.67% precision and 89.93% recall. Thanks to our dictionary-based learner models, which are known to be robust in the regime with few labeled training examples per class (described by A. Angelova, Y. Abu-Mostafa, and P. Perona in 2005 entitled "Pruning training sets for learning of object categories," In *Proc. IEEE Computer Society Conf. on Computer Vision and Patt. Recn.*, incorporated herein by reference), and our semi-supervised code aggregation that exploits both labeled and unlabeled data, face hash significantly outperforms deep learning based methods for such reduced training sample cases.

TABLE 1

Retrieval performance (%) of different hashing methods on 5,992 queries (200 known subjects) over 37,007 unseen faces (200 known subjects). Using 36-bit FaceHash codes, the average hash evaluation time is about 34 microseconds, and the average retrieval time is 0.2 milliseconds.

| Method | radius = 0 | | | radius ≤ 2 | | |
| --- | --- | --- | --- | --- | --- | --- |
| | Precision | Recall | F1 | Precision | Recall | F1 |
| SH (36-bit) [30] | 9.23 | 0.21 | 0.41 | 38.18 | 1.76 | 3.36 |
| KLSH (36-bit) [14] | 22.09 | 4.05 | 6.84 | 36.64 | 9.33 | 14.87 |
| AGH1 (36-bit) [17] | 33.37 | 54.17 | 41.30 | 16.97 | 82.87 | 28.17 |
| AGH2 (36-bit) [17] | 25.85 | 58.10 | 35.78 | 12.04 | 88.60 | 21.20 |
| LDAHash (36-bit) [27] | 30.05 | 1.28 | 2.45 | 33.89 | 17.73 | 23.28 |
| FaceHash (36-bit) | 97.39 | 82.33 | 89.23 | 96.41 | 89.24 | 92.69 |
| FaceHash (48-bit) | 97.26 | 80.42 | 88.04 | 98.62 | 87.41 | 92.67 |

Cross-Representation Face Retrieval

Existing state-of-the-art face representations, such as attribute features [Kumar (2009)], High-dimensional LBP [Chen (2013)], Deepface [Taigman (2014)], and DeepID2 [Sun (2014)], are incompatible and incommensurable directly, rendering challenging similarity assessment across representations (for example, searching a collection of faces represented using the high-dimensional LBP using queries based on other features). The face hash framework can be easily extended to address such cases by hashing multiple representations into a common space.

TABLE 2

Retrieval performance (%) of different hashing methods on 5,992 face queries (200 known subjects) in a 73K database containing 37,007 unseen faces (200 known subjects) and 35,902 unseen faces (~27,859 unknown subjects).

| Method | radius = 0 | | | radius ≤ 2 | | |
|---|---|---|---|---|---|---|
| | Precision | Recall | F1 | Precision | Recall | F1 |
| SH (36-bit) [30] | 6.56 | 0.15 | 0.30 | 37.18 | 1.98 | 3.76 |
| KLSH (36-bit) [14] | 16.97 | 3.73 | 6.11 | 31.93 | 8.38 | 13.28 |
| AGH1 (36-bit) [17] | 31.74 | 56.12 | 40.55 | 17.17 | 82.30 | 28.42 |
| AGH2 (36-bit) [17] | 22.44 | 57.48 | 32.28 | 12.17 | 89.52 | 21.42 |
| LDAHash (36-bit) [27] | 23.42 | 0.65 | 1.26 | 45.30 | 10.25 | 16.72 |
| FaceHash (36-bit) | 95.91 | 82.29 | 88.58 | 88.05 | 89.38 | 88.71 |
| FaceHash (48-bit) | 96.54 | 80.42 | 87.75 | 96.45 | 87.41 | 91.71 |

TABLE 3

Retrieval performance (%) of different hashing methods on 5,992 face queries (200 known subjects) over a 0.7M database containing 37,007 unseen faces (200 known subjects) and 672,876 unseen faces (~27,392 unknown subjects).

| Method | radius = 0 | | | radius ≤ 2 | | |
|---|---|---|---|---|---|---|
| | Precision | Recall | F1 | Precision | Recall | F1 |
| KLSH (36-bit) [14] | 16.97 | 3.73 | 6.11 | 31.93 | 8.38 | 13.28 |
| AGH1 (36-bit) [17] | 18.38 | 56.12 | 27.69 | 7.75 | 82.30 | 14.16 |
| AGH2 (36-bit) [17] | 13.56 | 57.48 | 21.94 | 5.53 | 89.52 | 10.41 |
| LDAHash (36-bit) [27] | 23.42 | 0.65 | 1.26 | 45.11 | 10.25 | 16.71 |
| FaceHash (36-bit) | 82.17 | 82.29 | 82.23 | 47.58 | 89.38 | 62.10 |
| FaceHash (48-bit) | 90.74 | 80.42 | 85.27 | 81.74 | 87.41 | 84.48 |

Note that SH stops producing useful results in this experiment, thus we omit its comparison. Using 36-bit FaceHash codes, it takes 16.4 milliseconds to query 0.7M faces; and about 24 seconds to index all 0.7M faces by FaceHash.

At training, when such multimodal data arrive at a tree split node, we simply enforce the same random class partition for all modalities, and learn for each modality a dictionary pair $D^\pm$ independently using the shared class partition. During training, only the splitting function of one dominant (usually the most discriminant) modality is evaluated for each arriving data point; during testing, based on the modality of an arriving point, the corresponding splitting function acts independently. This permits to merge multiple priorly trained feature extraction algorithms and databases.

Figure 2:
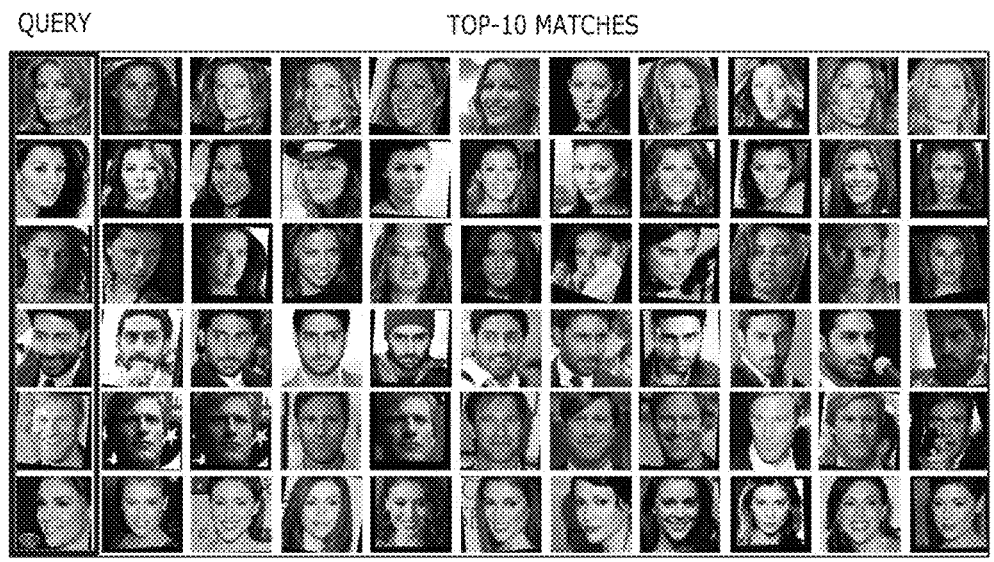
FIG. 2 illustrates the 10 top matching faces retrieved by a face hash, executed for example on an electronic processor, for 6 different face queries in a public dataset in accordance with one embodiment.

We represent each training face in Pubfig using the values of 73 attributes from [Kumar (2009)] (see FIG. 2), and use the high dimensional LBP and the attribute representation to jointly build the face hash index trees. We repeat the experiments reported in Tables 1, 2, and 3; this time, queries are expressed using attribute features to search for unseen faces of the same subjects represented using high-dimensional LBP features in a large database, with the rest of the faces acting as distractors. Several cross-representation face query examples are shown in FIG. 3. FachHash obtains 95.09% mean average precision (MAP), and outperforms the state-of-the-art cross-representation coding scheme SM [Rasiwasia (2010)] which gives 92.32% MAP. Note that face hash codes are ×200 shorter than codes generated by SM, and we observe a three orders of magnitude query speedup over SM. In Table 4, face hash shows almost identical recall and insignificant drop in precision for large-scale cross-representation retrieval.

TABLE 4

FaceHash cross-representation face retrieval performance (%) using attribute queries on large scale datasets (36-bit).

| | radius = 0 | | radius ≤ 2 | |
|---|---|---|---|---|
| | Precision | Recall | Precision | Recall |
| Pubfig dataset | 93.12 | 77.24 | 95.56 | 88.01 |
| 73K dataset | 91.49 | 77.24 | 87.75 | 88.01 |
| 0.7M dataset | 76.93 | 77.24 | 46.09 | 88.01 |

Face Verification Using Face Hash Codes

Figure 4:
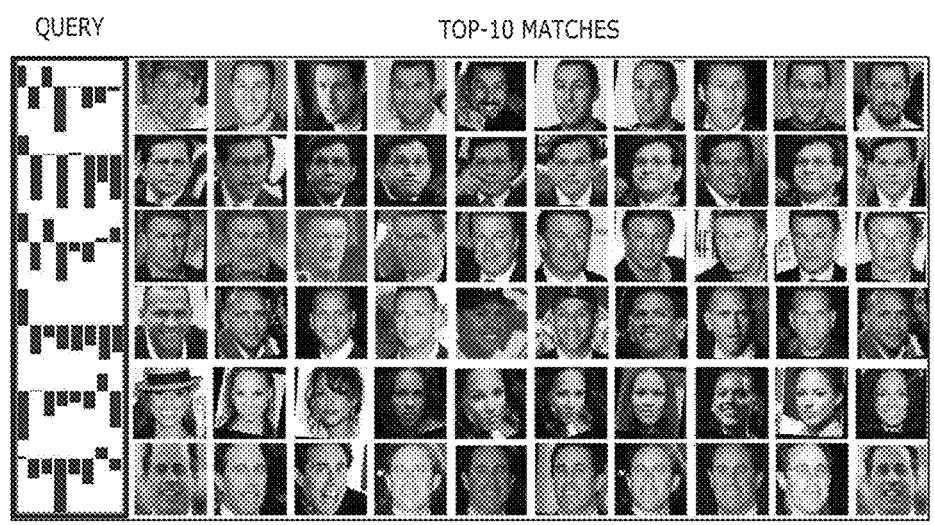
FIG. 4 is an image showing the 10 top matching faces retrieved by the face hash for different attribute queries in the public dataset in accordance with one embodiment.
Figure 5:
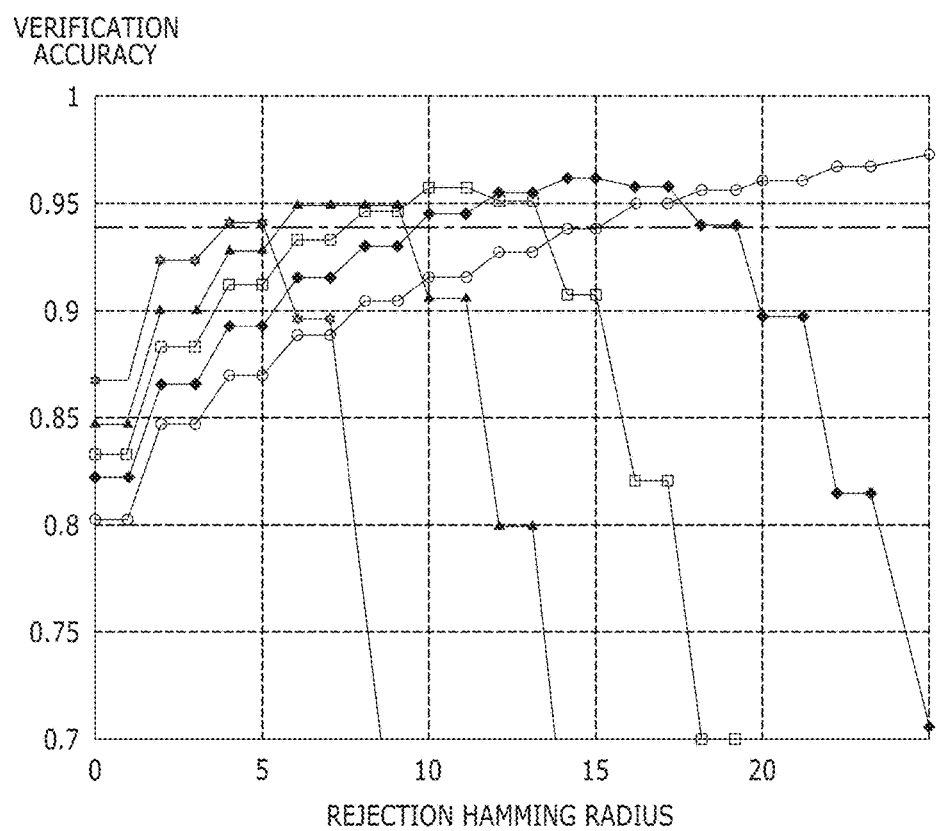
FIG. 5 is a graph showing face verification accuracy using different lengths of face hash codes on the public dataset as a function of the rejection radius r, in accordance with one embodiment.

We randomly sample 5000 positive and 5000 negative pairs from testing samples in the Pubfig dataset. A positive pair contains two faces from the same subject, and a negative pair contains two faces from different subjects. We first perform face verification using the original features, i.e., normalized high-dimensional LBP vectors, by comparing the inner product of each pair with a varying threshold, yielding 93.91% peak verification accuracy. We repeat the verification experiment using face hash codes, with the Hamming metric as the measure of dissimilarity between each pair of faces. FIG. 4 shows verification accuracy at different code lengths with varying rejection radius r. Note that the optimal threshold can be learned from training data; and we show the performance for all values of r for illustration purposes only. Face hash codes significantly boost verification accuracies of the raw feature. We conclude that in addition to enabling fast indexing and large scale retrieval, face hash also provides a way to potentially enhance any face features for face identification (this being the core task of the recently reported deep learning algorithms).

Face Hash Tree Incremental Updates

In practical face identification applications, the blacklist of subjects being looked up can undergo changes (insertions and deletions). It is therefore essential to be able to update the index keeping it tuned to the task of detecting the listed subjects, yet without fully retaining the representation.

We now construct face hash trees from the first 150 subjects in Pubfig, using 30 training faces per subject. We then incrementally insert the remaining 50 subjects into trees selected using our code aggregation scheme. When faces of a new subject arrive at a tree split node, we maintain the previous random class partition paradigm, and assign this new subject to the right or left partition randomly. In this way, we avoid changing codes already assigned to existing subjects, and also minimize code replications for new subjects.

We used the updated face hash trees to hash 30 training faces of each existing subject, and then used the obtained codes to query the unseen faces of the same subjects hashed with the original trees. We obtain 96.76% precision and 89.60% recall, which indicates that codes assigned to existing subjects are not affected by incremental subject insertions. For comparison, we then used the updated face hash trees to hash 30 training faces for each new subject, and use the obtained codes to query their unseen faces hashed using fully updated trees, yielding 97.73% precision and 84.15% recall. This shows that unique codes are encouraged for new subjects. These results are valid for incremental subject deletions by reversing the process. Note that this incremental update scheme does not (yet) benefit from the proposed code aggregation process, and codes assigned to new subjects can deviate from optimum after intensive updates. However, since it takes minutes to rebuild a single index tree, the seconds to re-index a million faces, an infrequent background hash index rebuilding is expected to optimize retrieval performance.

To address requirements specific to large-scale face recognition, we developed a hashing procedure for representing and indexing large-scale collections of human faces, and demonstrated that the proposed scheme achieves high precision and recall in millisecond retrieval time on a database of 0.7 million unconstrained faces. The technique is based on a combination of random forest and information-theoretic tree aggregation, leading to state-of-the-art performance in numerous scenarios and with very reasonable learning data size and computational resources.

Any patents or publications mentioned in this specification are indicative of the levels of those skilled in the art to which the invention pertains. These patents and publications are herein incorporated by reference to the same extent as if each individual publication was specifically and individually indicated to be incorporated by reference. In case of conflict, the present specification, including definitions, will control.

The present disclosure described herein and representative embodiments, are exemplary, and are not intended as limitations on the scope of the invention. Changes therein and other uses will occur to those skilled in the art which are encompassed within the spirit of the invention as defined by the scope of the claims.

Various features and advantages of embodiments of the invention are set forth in the following claims.

What is claimed is:

1. A method of large-scale face representation comprising:
    receiving, with an electronic processor, at least one image of a subject of interest;
    applying, with the electronic processor, at least one subspace model as a splitting binary decision function on the at least one image of the subject of interest;
    generating, with the electronic processor, at least one binary code from the at least one splitting binary decision function;
    applying, with the electronic processor, a code aggregation model to combine the at least one binary codes generated by the at least one subspace model;
    generating, with the electronic processor, an aggregated binary code from the code aggregation model;
    using the aggregated binary code to provide a hashing scheme; and
    executing the hashing scheme and performing a face recognition.

2. The method of claim 1, further comprising executing the hashing scheme and performing a face verification.

3. The method of claim 1, wherein applying, with the electronic image processor, at least one subspace model includes applying at least one subspace model using dictionary learning.

4. The method of claim 1, further comprising applying the code aggregation model based on preserving mutual information.

5. The method of claim 1, further comprising using the at least one subspace model as splitting nodes in a one or more tree-based decision system.

6. The method of claim 5, wherein each tree in the one or more tree-based decision system includes one or more hierarchically connected split nodes and one or more leaf nodes.

7. The method of claim 6, further comprising associating each split node with a weak learner.

8. The method of claim 6, further comprising storing data associated with data points of one or more leaf nodes received during a training phase.

9. The method of 6, further comprising evaluating each arriving data point and sending the data point to a left child or a right child based on the weak learner.

10. An image processing system comprising:
    an electronic processor configured to
        receive at least one image of a subject of interest;
        apply at least one subspace model as a splitting binary decision function on the at least one image of the subject of interest;
        generate at least one binary code from the at least one splitting binary decision function;
        apply a code aggregation model to combine the at least one binary codes generated by the at least one subspace model;
        generate an aggregated binary code from the code aggregation model;
        use the aggregated binary code to provide a hashing scheme; and
        execute the hashing scheme and perform a face recognition.

11. The image processing system of claim 10, wherein the electronic processor is further configured to
    apply at least one subspace model using dictionary learning.

12. The image processing system of claim 10, wherein the electronic processor is further configured to
    apply the code aggregation model based on preserving mutual information.

13. The image processing system of claim 10, wherein the electronic processor is further configured to
    use the at least one subspace model as splitting nodes in a one or more tree-based decision system.

14. The image processing system of claim 13, wherein each tree in the one or more tree-based decision system includes one or more hierarchically connected split nodes and one or more leaf nodes.

15. The image processing system of claim 14, wherein the electronic processor is further configured to
    associate each split node with a weak learner.

16. The image processing system of claim 14, wherein the electronic processor is further configured to
    store data associated with data points of one or more leaf nodes received during a training phase.

17. The image processing system of claim 14, wherein the electronic processor is further configured to
    evaluate each arriving data point and send the data point to a left child or a right child based on the weak learner.

* * * * *